UNITED STATES PATENT OFFICE.

HUGH RODMAN, OF PITTSBURG, PENNSYLVANIA.

ART OF CEMENTATION BY DRY PACKING.

949,443. Specification of Letters Patent. Patented Feb. 15, 1910.

No Drawing. Application filed May 15, 1909. Serial No. 496,268.

*To all whom it may concern:*

Be it known that I, HUGH RODMAN, a citizen of the United States, and a resident of Pittsburg, in the county of Allegheny and State of Pennsylvania, have made a new and useful Invention in the Art of Cementation by Dry Packing, of which the following is a specification.

This invention relates to the art of cementation by dry packing and more particularly to a method of manufacturing or treating cementing materials.

In that class of cementing materials in which a carbonaceous material, such as coke, raw bone, soft non-coking coals, lignite and peat are used in conjunction with an energizing material, such as soda-ash or calcium oxid, as described by me in a co-pending application for patent, Serial No. 496,271, May 15, 1909, it is often difficult to establish and maintain an intimate contact between the two or more substances used owing to the tendency of the particles of different densities to separate. By energizing substance, I mean such material, not necessarily carbonaceous material, as will when added to an inactive carbonaceou. substance, render such carbonaceous substance active, as a carbonizing agent.

I have found that a very intimate mixture of coke or other porous carbonaceous material, such as raw bone, soft non-coking coals, lignite and peat (these latter materials while not porous until heated, become porous when heated to a sufficient extent), and an energizing substance may be secured by heating the mixture preferably in a closed vessel above the fusing point of the energizing substance so that the energizing substance will impregnate the pores of the carbonaceous material.

It is obvious that the impregnating material may change in character owing to temperature or to contact with the heated carbonaceous material. For instance, sodium carbonate may change to sodium oxid, in which event the energizing substance will be sodium oxid and not sodium carbonate. The mechanical strength of such impregnated carbonaceous materials I find is not diminished by the treatment and in some cases is even increased.

Having thus described my invention, what I claim is:

1. The method of producing a cementing material which consists in heating a mixture of carbonaceous material and an energizing substance to a temperature at least as high as the fusing point of the energizing substance.

2. The method of producing cementing material which consists in heating carbonaceous material and soda-ash to a temperature at least as high as the fusing point of the soda ash.

3. The method of producing cementing material which consists in impregnating carbonaceous material with fused energizing substance.

4. The method of producing cementing material which consists in heating an energizing substance so as to fuse the same in contact with a carbonaceous material.

5. The method of producing cementing material which consists in mixing carbonaceous material with an energizing substance and then in heating the mass so as to impregnate the carbonaceous material with the energizing substance.

6. The method of producing a cementing material which consists in heating a mixture of a carbonaceous material and a fusible material so that the fusible material will impregnate the carbonaceous material and deposit therein an energizing substance.

7. Cementing material consisting of carbonaceous material impregnated with fused energizing substance.

8. Cementing material consisting of carbonaceous material and an energizing substance introduced into said carbonaceous material by fusing said substance in the presence of said material.

9. Cementing material comprising carbonaceous material and fused soda-ash.

10. Cementing material consisting of porous carbonaceous material impregnated with fused energizing substances.

11. Cementing material consisting of porous carbonaceous material impregnated with fused soda-ash.

12. Cementing material consisting of a carbonaceous material having within its pores energizing material deposited from a fused material.

In testimony whereof, I have hereunto subscribed my name this 12th day of May, 1909.

HUGH RODMAN.

Witnesses:
C. W. McGHEE,
GEO. C. WALKER.